(Model.)
2 Sheets—Sheet 1.
J. GASIOROWSKI.
MACHINE FOR CUTTING TWIST DRILLS.
No. 390,223. Patented Oct. 2, 1888.
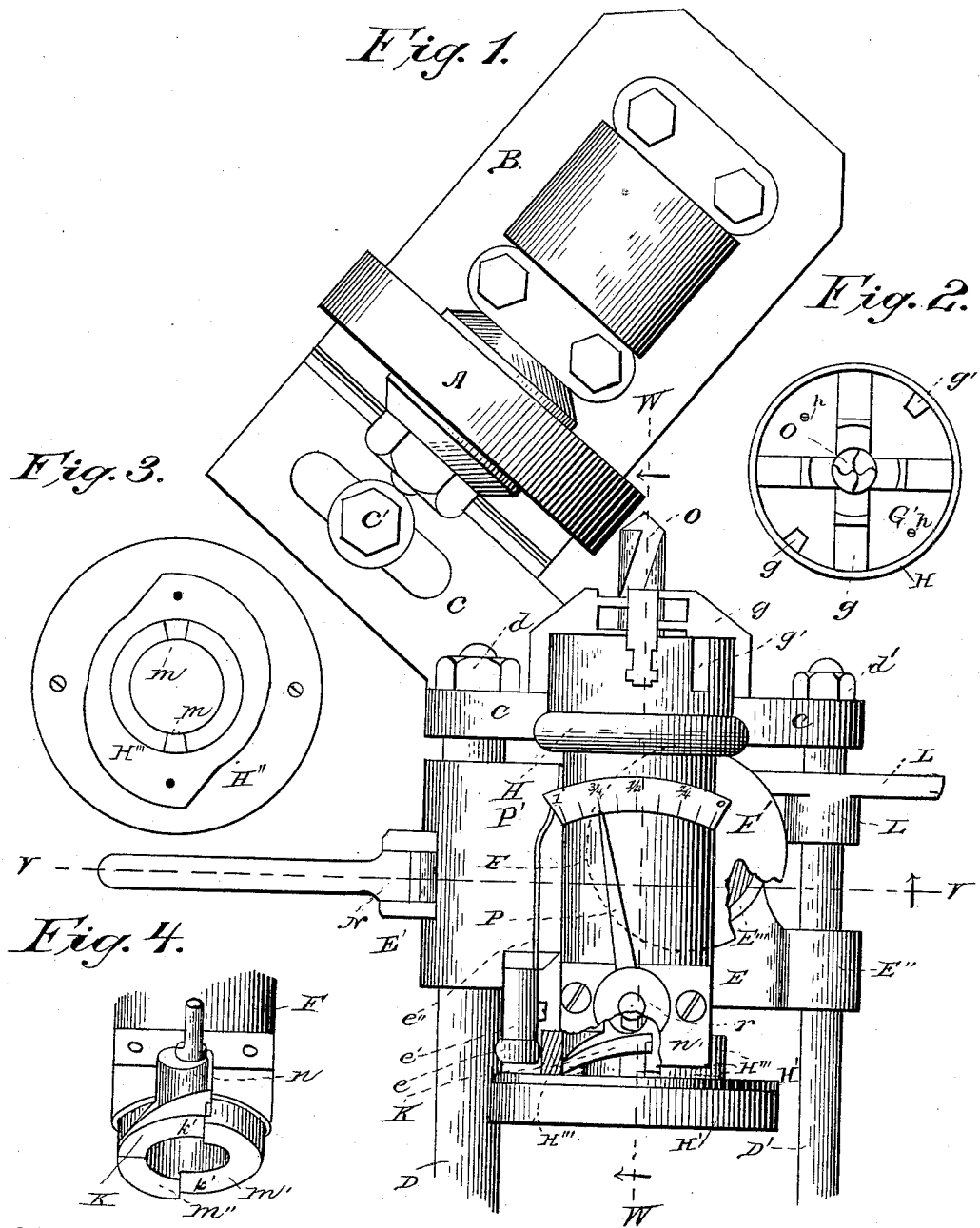
Witnesses
H. S. Oliver
F. R. Harding
Inventor
Joseph Gasiorowski
By his Attorney (Model.) 2 Sheets—Sheet 2.
J. GASIOROWSKI.
MACHINE FOR CUTTING TWIST DRILLS.
No. 390,223. Patented Oct. 2, 1888.
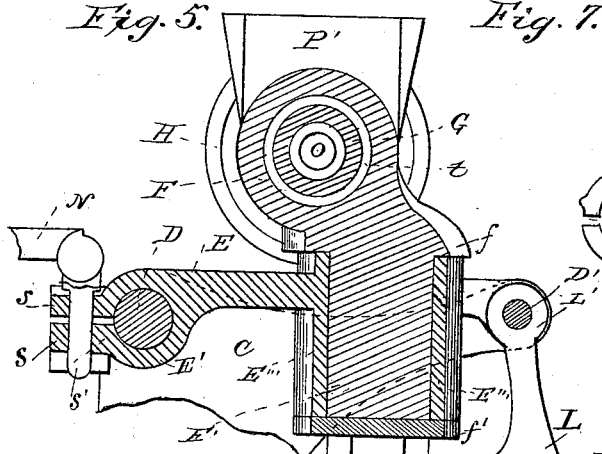
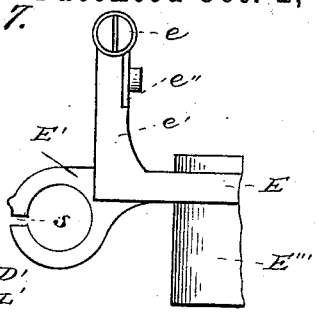
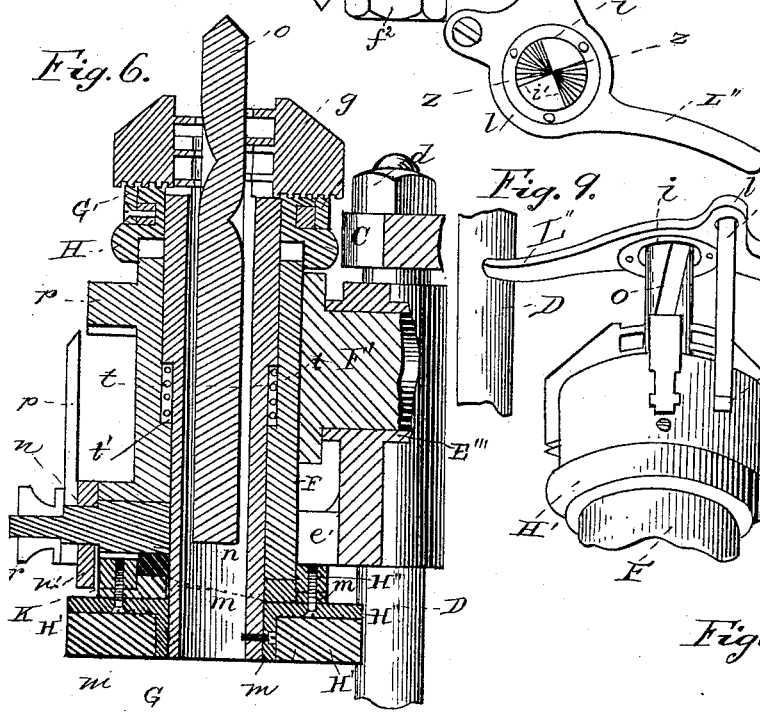
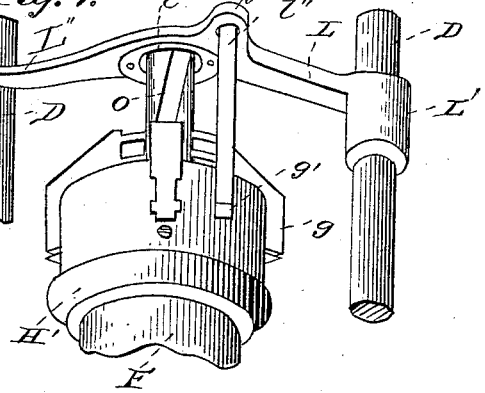
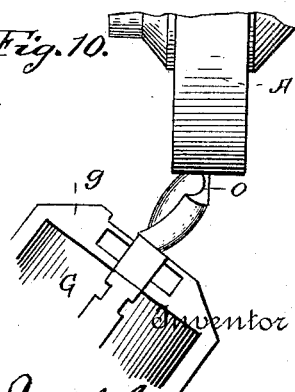
Witnesses
Harry S. Rohrer
F. R. Harding
Inventor
Joseph Gasiorowski
By his Attorney
O. E. Duff

UNITED STATES PATENT OFFICE.

JOSEPH GASIOROWSKI, OF BROOKLYN, NEW YORK.

MACHINE FOR CUTTING TWIST-DRILLS.

SPECIFICATION forming part of Letters Patent No. 390,223, dated October 2, 1888.

Application filed October 16, 1886. Serial No. 216,406. (Model.)

*To all whom it may concern:*

Be it known that I, JOSEPH GASIOROWSKI, of Brooklyn, in the county of Kings and State of New York, have invented certain new and useful Improvements in Drill-Grinding Machines; and I do hereby declare that the following is a full, clear, and exact description of the invention, which will enable others skilled in the art to which it appertains to make and use the same, reference being had to the accompanying drawings, and to the letters of reference marked thereon, which form part of this specication.

The object and nature of my invention will be fully set forth in the following specification and claims.

In the drawings, Figure 1 is a top view of the machine complete. Fig. 2 is an end view of the chuck for holding the drill. Fig. 3 is an inverted view of one of the handles detached from the spindle. Fig. 4 is a view of one end of the spindle-rest. Fig. 5 is a sectional view taken on the line $v\,v$ of Fig. 1. Fig. 6 is a longitudinal section on the line $w\,w$, Fig. 1, a part being broken away. Figs. 7, 8, 9, and 10 are detached details.

Similar letters of reference indicate similar parts in the respective figures.

A is the grindstone, mounted in suitable bearings supported by the bed-plate B.

C is a cast-iron angular support secured to the bed-plate B by means of the bolt C'. This support C is provided with the slide-rods D D', secured thereto by the nuts $d\,d'$.

E is a carriage made of cast-iron and having the tubular parts E' E'', which slide on the rods D D', and is also provided with the hollow spindle-rest F, which serves as a bearing for the hollow spindle G. The tube E' is split on one side and is provided with flanges $s$, through which passes the bolt $s'$, to the upper end of which is pivoted the eccentric-lever N. The object of this lever is to press the flanges $s$ together and lock the tube on the bar D.

The carriage E is provided with the tube E''', which may be cast integral with it, or the carriage may be bored and a short piece of pipe inserted in the hole and secured by soldering or otherwise. This tube E''' extends a short distance above the carriage E and a longer distance below it, as shown in Fig. 5.

F' is a pin secured to the under side of the spindle-rest F, said pin being provided with a flange, $f$. This pin is adapted to fit loosely in the tube E''', and is held in position by means of the washer $f'$ and screw $f^2$. The flange of the pin rests on the upper edge of the tube and serves as a pivot for the spindle-rest F.

The hollow spindle G is provided at one end with a chuck, G', to which is secured by means of screws $h$ the handle H, which serves to turn the chuck and the drill when the drill is being ground. The chuck and the handle are provided with slots $g'$, for a purpose hereinafter described, and the chuck is also provided with jaws $g$, for the purpose of holding the drill.

At the end of the spindle-rest F remote from the chuck G' are cut out the helicoidal V-shaped recesses $m'\,m''$, thereby forming a double cam-face on the spindle-rest. The part $m''$ is again recessed for the reception of the cam K. This cam K has a certain amount of play at its largest end, and is adjustable in the recess by means of the eccentric $n$, which is operated by the index-lever P. The reason for this adjustability will be explained hereinafter.

At the point of junction of the respective ends of the helicoidal recesses $m'\,m''$ are formed the depressions or notches $k\,k'$, for a purpose to be hereinafter described. The hollow spindle G extends outwardly from the spindle-rest F at both ends, and to the end of the spindle remote from the chuck G' is detachably secured the handle H'. To this handle is secured the plate H'', which is provided with the hollow projecting part H'''. The outer surface of H''' is eccentric, and the inner surface is circular and is provided with the lugs $m\,m$. The circular part fits over the spindle-rest F, and when the spindle G is revolved the lugs $m\,m$ will in turn slide over the cam K, the helicoidal recess $m'$ allowing free play to the lug not in engagement with K. Projecting upward from the carriage E is an arm, $e'$, which supports the roller $e$. This roller impinges against the eccentric outer surface of the projection H''' of the plate H'' and is held in engagement therewith by means of the spring $e''$, which is fastened to the arm $e'$ and bears against the spindle-rest F at a point beyond the pivot F'.

L is a templet-holder pivoted at its end L' on the rod D', the other end, L'', being adapted to rest on the rod D. About midway of the templet-holder is a circular enlargement provided with a hole. To this enlargement is secured, by rivets or otherwise, the templet $i$, which consists of a circular plate having portions cut out of its central part, so as to leave two V-shaped portions, $i'$, which are bent outward through the hole in the enlargement $l$ and their points brought together, as shown in Figs. 5 and 8. Extending from the circular enlargement $l$ is the arm $l'$, to which is secured, at right angles thereto, the stud $l''$, which, when the templet is in use, is adapted to engage with one of the slots $g'$ in the chuck G'.

Around the spindle G is placed a coiled spring, $t$, which has a bearing against a shoulder, $t'$, in the interior of the spindle-rest F, and has a tendency to force the spindle G forward toward the grindstone.

P' is a graduated plate secured to the spindle-rest F, and $o$ is the drill.

The operation is as follows: When the drill-carrying mechanism is in its normal position, the spring $t$ will be expanded and the hollow spindle G will be projected forward beyond the end of the spindle-rest F as far as the handle H' will permit. The lugs $m$ $m$ will be in the recesses or notches $k$ $k'$, and the roller $e$ will be in engagement with the eccentric surface of H''' at one of the points where the projection is narrowest in transverse section, being held thereto by the force of the spring $e''$. The carriage E being withdrawn from the grindstone a sufficient distance, the templet-holder is put in position for centering the drill, as shown in Fig. 9, the stud $l''$ being in one of the slots $g'$ of the chuck. The drill is now inserted in the hollow spindle G and projected beyond the chuck till its point enters the templet $i$, which will cause it to assume a proper position for grinding. It is then securely fastened in the chuck in the usual manner and withdrawn from the templet, which is then turned over out of the way. The carriage is then pushed forward toward the grindstone until the stone begins to grind against the lower part of one of the lips of the drill, when the operator will depress the eccentric-lever N, thereby locking the carriage securely in its place. The drill in the above-described position will form, with the cylindrical face of the stone, an angle of about forty-two degrees, as shown in Fig. 1. Either of the handles H H' can now be used to operate the drill-holding mechanism, and by turning the handle from right to left the drill will be revolved, and at the same time the inclined surface of the projection H''' slides over the roller $e$ and causes the spindle-rest F to revolve on its pivot, and thereby bring the lip of the drill from right to left over the face of the grindstone. As it is evident that this movement would soon jam the lip of the drill against the grindstone, it is necessary to give the drill a gradual backward movement, and this is accomplished by means of the studs, or rather one of them, riding up the inclined face of the cam K, and thereby forcing the spindle G, and with it the drill, backward against the force of the spring $t$. When the operator has turned the handle a trifle over a quarter of a circle, (say about ninety-five degrees,) the drill will form an angle of about thirty-five degrees with the cylindrical face of the stone, as shown in Fig. 10, in which position one lip of the drill will have been ground. When the handle is turned farther, the depression in the eccentric surface of H''' will reach the roller $e$, and the force of the spring $e''$ will rotate the spindle-rest F back to its normal position, so as to bring the drill again to an angle of forty-two degrees with the cylindrical face of the grindstone. By still turning the handle till half of a circle (or one hundred and eighty degrees) is reached the lugs $m$ $m$ will reach the depressions or notches $k$ $k'$, and the force of the spring $t$ will force the spindle G, and with it the drill, forward, when, by still turning the handle, the operation will be repeated and the other lip of the drill be ground.

As drills of different sizes do not require the same degree of backward movement, I have made the cam K adjustable by means of the eccentric $n$, by which means the inclination of the surface of the cam K can be changed at pleasure. As this eccentric $n$ is controlled by the index-lever P, it is obvious that by means of this lever and the graduated plate P' the operator can adjust the cam K to suit drills of different sizes.

It will thus be seen that by means of my invention I accomplish three different movements of the drill simultaneously—viz., a rotary, a reciprocal, and a pivotal movement.

Having thus fully described my invention, what I claim is—

1. In combination, a supporting-plate, slide-rods secured thereto, a sliding carriage supported by said slide-rods, a horizontal spindle-rest carried by said carriage, a vertical tube in said carriage extending below and above the same between the slide rods, a downwardly-extending pin secured to said spindle-rest and operating in said vertical tube, a screw and washer whereby the pin is held in the tube, and a hollow spindle carried by the spindle-rest, substantially as described.

2. The combination, with the spindle-rest pivoted to swing laterally and provided with a double cam face or surface formed in its rear end, of a spindle provided upon its rear portion with lugs to bear upon the cam-faces in the end of the spindle-rest, a coiled spring within the spindle-rest and embracing the spindle to hold the lugs in engagement with the cam-faces, a circular outer eccentric surface around the rear portion of the spindle, a roller to bear upon said eccentric surface, and a spring to hold the eccentric surface in engagement with the roller, said spring bearing upon the spindle-rest at a point beyond the pivot of the same, substantially as set forth.

3. The combination, with a movable carriage, of a spindle-rest pivotally mounted upon the carriage to swing horizontally, a spindle carried by the spindle-rest, a chuck carried by one end of the spindle, a circular projection around the rear end of the spindle and provided with a continuous outer eccentric surface, a roller carried by the carriage and adapted to impinge against the eccentric surface, and a plate-spring secured to the movable carriage and bearing against the spindle-rest at a point beyond the pivot of the same to hold the eccentric surface in engagement with the roller, substantially as described.

4. The combination, with a movable carriage, of a spindle-rest pivoted to the carriage to swing laterally, a hollow spindle carried by the spindle-rest, a chuck secured to one end of the spindle, a plate secured to the opposite end of the spindle and provided with a circular projection embracing the end of the spindle-rest and with a continuous outer eccentric surface, an arm extending upwardly from the carriage beside the rear end of the spindle, a roller mounted upon said arm and bearing upon said eccentric surface, and a plate-spring secured to said arm and extending forwardly and engaging the spindle-rest upon the opposite side of its pivotal point to hold the eccentric surface in engagement with the roller, for the purpose set forth.

5. In combination, a movable carriage, a spindle carried thereby, a chuck provided with slots and secured to said spindle, a templet-holder pivoted to swing in front of said chuck, a templet, and a stud secured to the templet-holder and adapted to enter one of said slots in the chuck when the templet is being used, as specified.

6. In combination, slide-rods, a movable carriage supported thereon, a spindle, a chuck provided with slots, a templet-holder pivoted to one of said rods so as to swing in front of the chuck and rest upon the opposite rod, a templet secured in an opening in said templet-holder, and a stud secured to the templet-holder and adapted to enter one of said slots in the chuck, as specified.

7. The combination, with the spindle-rest provided with the helicoidal recesses at its rear end and the spindle operated in its backward movement by said recesses, of a graduated plate, an index-lever, and an eccentric and cam whereby the backward throw of the spindle can be regulated, substantially as described.

8. The combination, with the spindle-rest provided with the helicoidal recesses in its rear end and a cam located in one of said recesses, of a spindle, a plate carried by the end of said spindle, lugs carried by said plate and operating in said recesses, and a spring encircling the spindle and holding the lugs in the recesses, substantially as described.

9. The combination, with the base-plate and a grinding-wheel mounted upon the same, of an angular supporting-plate adjustably secured to the base-plate, parallel slide-rods secured to and extending laterally from said angular supporting-plate, a carriage supported upon the slide-rods, and a spindle-rest, spindle, and chuck carried by the carriage, substantially as set forth.

In testimony that I claim the foregoing as my own I affix my signature in presence of two witnesses.

JOSEPH GASIOROWSKI.

Witnesses:
 ALEXANDER BENTZIG,
 SAMUEL WISE.